United States Patent [19]
Anslow et al.

[11] Patent Number: 6,042,861
[45] Date of Patent: Mar. 28, 2000

[54] PRESERVATIVE AND FLAVORING SYSTEM

[75] Inventors: Patricia Ann Anslow; Malcolm Stratford, both of Sharnbrook, United Kingdom

[73] Assignee: Lipton, Division of Conopco, Inc., Englewood Cliffs, N.J.

[21] Appl. No.: 09/177,479

[22] Filed: Oct. 22, 1998

[30] Foreign Application Priority Data

Oct. 28, 1997 [EP] European Pat. Off. .............. 97308609

[51] Int. Cl.$^7$ ................................ A23L 2/00; A23F 3/00
[52] U.S. Cl. ........................ 426/330.3; 426/477; 426/597
[58] Field of Search ..................................... 426/597, 477, 426/330.3

[56] References Cited

U.S. PATENT DOCUMENTS

| | | | |
|---|---|---|---|
| 4,567,056 | 1/1986 | Schmidt | 426/607 |
| 5,008,441 | 4/1991 | Nakanishi et al. | 560/75 |
| 5,431,490 | 7/1995 | Calderas et al. | 426/330 |

FOREIGN PATENT DOCUMENTS

| | | |
|---|---|---|
| 144 417 | 8/1988 | European Pat. Off. . |
| 4434314 | 3/1996 | Germany . |
| 57/194775 | 11/1982 | Japan . |

OTHER PUBLICATIONS

Database Abstract WPIDS. AN 93–348369 [44] for JP 5255126, Oct. 1993.
Dabatase Abstract WPIDS. AN 83–18306K [08] for JP 58005172, Jan. 1983.
International Search Report in the application of PCT/EP 98/06494.
European Search Report in the application of EP 97/308609 received Mar. 26, 1998.
Patent abstract of JP 56021557.
Derwent abstract of JP 49015788.
Patent abstract of JP 59015477.
Derwent abstract of CN 1081578.
Derwent abstract of DE 4434314.
Patent abstract of JP 08066171.

*Primary Examiner*—Anthony J. Weier
*Attorney, Agent, or Firm*—James J. Farrell

[57] ABSTRACT

A preservative and flavoring system for tea based beverages. The system contains a tea extract, an antimicrobially active amount of cinnamic acid or an acidic derivative thereof and an acidulant in an amount that maintains the pH of the beverage below pH 4.5. The system preferably includes an additional preservative such as a weak acid preservative. It can be used to prepare an ambient-stable tea based beverage and is suitable for cold filling.

11 Claims, 6 Drawing Sheets

50ml YEPD, S.cerevisiae X2180, 42h

10ml YEPD, S.cerevisiae X2180, 140h

10ml YEPD, S.cerevisiae X2180, 72h

10ml capped YEPD, X2180, 3days

10ml YEPD, S.cerevisiae X2180, 81h

10ml capped YEPD, X2180, 3days

6,042,861

PRESERVATIVE AND FLAVORING SYSTEM

The present invention relates to a preservative and flavouring system for tea based beverages. The invention also relates to an ambient-stable tea based product that includes said preservative and flavouring system and a method for preparing same.

BACKGROUND AND PRIOR ART

In recent years there has been an ever increasing choice for consumers who wish to quench their thirst with ready made beverages. Many of those are now turning from the well known soft drinks to tea based beverages, be those carbonated or still, and the "natural" refreshment they can provide.

Tea contains a complex combination of enzymes, biochemical intermediates and structural elements normally associated with plant growth and photosynthesis. There are also many natural substances that give tea its unique taste, astringency, aroma and colour. Many of these are produced by the oxidation reactions that occur during the so-called fermentation stage of black tea manufacture. Tea production has long been driven by traditional processing methods with only a fundamental understanding of the chemistry that is involved. As a consequence manufacturers have discovered making ambient stable tea based beverages at the volumes required to compete with more traditional soft drinks is not simply a matter of flavouring a soft drink with tea.

The flavour of a tea based beverage and its stability rely on the stability of the beverage as a whole. It is therefore critical to preserve the quality of the beverage. The yeasts and moulds that can grow in tea based beverages and other soft drinks can be killed or controlled by heat treatment or by use of preservatives. Some tea based beverages are therefore pasteurised and then bottled in glass or special heat stable PET containers. This is known as "hot filling". Unfortunately this can be an expensive operation which creates a great deal of environmentally unfriendly waste. It has therefore become more attractive for manufacturers to pack their tea based products in standard PET containers which can range from single serve units to multi-serve packs and maintain the stability of the product using tailor made flavour and preservative systems. This is known as "cold filling". It is also useful in that one can readily use a tea concentrate or powder.

Unfortunately the use of common preservatives can affect the flavour of a tea based beverage. This is particularly true for sulphite and sorbate. Adding a strong flavour such as lemon can offset the preservative taste. However consumers are keen to experience other flavours. Furthermore, some of those consumers that were drawn to tea based products as a more healthy and natural alternative to soft drinks sometimes view preservatives as the sort of synthetic additives they would rather avoid.

Many countries have regulations that prohibit the use of certain food additives, including some preservatives, in foods and beverages. Regulations can vary widely but there is a clear trend for foods to contain fewer and lower levels of chemical preservatives, particularly synthetic ones.

Accordingly there is a need for pleasantly flavoured, ambient-stable, tea based beverages that have low levels of synthetic preservatives.

One strategy for avoiding the use of synthetic chemical additives is to use naturally occurring and less potentially toxic alternatives such as oils of cinnamon, thyme etc. Back in the early 80's Japanese researchers screened a variety of substances, including natural products and food additives, with known preservative properties but low toxicities and hoped to find synergistic combinations. Indeed Japanese patent specification JP A-57-194775 discloses an agent that is said to improve the preservation and quality of food containing cinnamic acid and another organic acid as effective components. The other organic acid can be citric, acetic, malic, fumaric, sorbic, tartaric or lactic acid. It is claimed that the combination of cinnamic acid and these other organic acids results in a synergistic antibacterial action. It is suggested that about 50 to 500 ppm cinnamic acid and from about 50 to 5000 ppm organic acid is used. These levels are used to preserve daikon (Japanese pickles), kamaboko (a boiled fish paste product), hampen (a Japanese cake made of pounded fish), Vienna sausage, mixed bean paste and flour paste. The specification does not mention any suitability for beverages, or tea.

EU legislation limits the use of sorbic acid to 300 ppm. There is no legal limit for cinnamic acid but the reported flavour usage within the industry is 31 ppm.

Cinnamon is a well known spice that is prized for its strong, distinctive and appealing flavour. Cinnamic acid is mainly used in the manufacture of methyl, ethyl, and benzyl esters for the perfume industry. The ethyl ester is used to make glass prisms and lenses. Other esters are used in medicine. The acid is also a known anthelmintic. The corresponding aldehyde is more pungent but is also used in the flavour and perfume industries.

The strong but not overbearing flavour of cinnamon together with its preservative ability and familiarity as a naturally occurring spice was recognised by the present inventors as being attractive as a key component of a flavouring system for use in ambient stable tea based beverages. Although there are some commercially available herbal teas that contain cinnamon, cinnamic acid is largely insoluble in low pH tea solutions.

The present inventors have now developed a preservative and flavouring system for tea based beverages which contains cinnamic acid in acceptably low concentrations in combination with an acidulant and optionally some additional preservatives which is particularly suitable for use in ambient-stable, tea based beverages.

STATEMENT OF THE INVENTION

The present invention in broad terms relates to a preservative and flavouring system for tea based beverages that comprises a tea extract, an antimicrobially active amount of cinnamic acid or an acidic derivative thereof and an acidulant in an amount that maintains the pH of the beverage below pH 4.5.

The preservative properties of the system may be supplemented by adding one or more weak acid preservatives.

The invention also relates to an ambient-stable tea based product that includes the aforementioned preservative and flavouring system, and a method for preparing same.

DETAILED DESCRIPTION OF THE INVENTION

Figure 1:
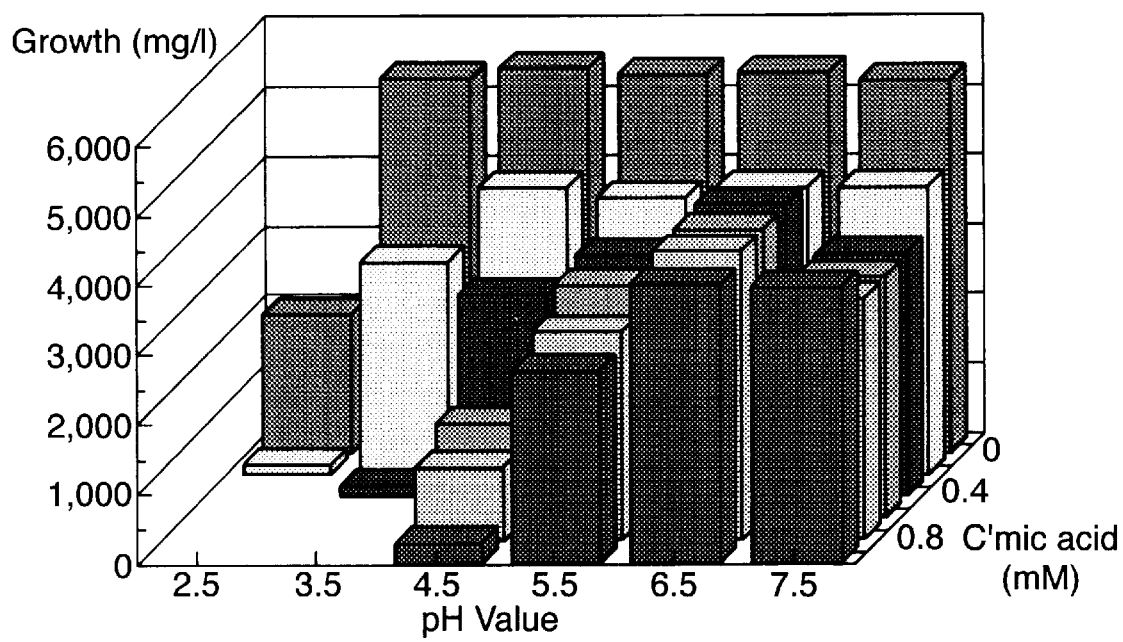
FIG. 1 represents a bar graph of values reported in Example 1.

The present invention relates to a preserving and flavouring system for tea based beverages. It comprises an antimicrobially active amount of cinnamic acid or a derivative thereof, and an acidulant in an amount that maintains the pH of the beverage below pH 4.5. The invention also relates to an ambient stable tea based product that includes the aforementioned system.

The term "tea based beverage" describes a beverage that contains the solid extracts of leaf material from *Camellia sinensis, Camellia assamica,* or *Aspalathus linearis.* The leaves may have subjected to a so-called "fermentation" step wherein they are oxidised by certain endogenous enzymes that are released during the early stages of "black tea" manufacture. This oxidation may even be supplemented by the action of exogenous enzymes such as oxidases, laccases and peroxidases. Alternatively the leaves may have been partially fermented ("oolong" tea) or substantially unfermented ("green tea"). The tea may be added to the beverage in various forms including an extract, a concentrate, a powder or as granules.

At low concentrations, such 0.1 to 3%, tea acts as a nutrient that enhances the potential for microbial spoilage. This is unexpected given the known antibacterial and antiviral properties of tea. It is not until one exceeds a concentration of 3% that tea begins to suppress the growth of yeasts and moulds.

Cinnamic acid (3-phenyl-2-propenoic acid) is a well known flavouring agent for cakes, drinks, chewing gum and ice cream. Derived from cinnamon which has long been added to foods, it is regarded in most countries as a useful and harmless flavouring. When dissolved in a tea based beverage cinnamic acid imparts a mild resinous odour resembling honey and flowers with a sweet and weak spicy taste. A flavouring effect is evident at concentrations above about 10 ppm. At concentrations above 30 ppm the flavour becomes particularly strong. An additional benefit is the suppression of unwanted preservative notes from chemicals such as sorbic and benzoic acids. Of the two stereoisomers that exist, the trans- isomer is more commonly of interest for use in flavouring.

Cinnamic acid was given GRAS (ie Generally Recognised as Safe) status by the FEMA (Flavouring Extract Manufacturers Association) in 1965. While there is no legislation in the European Union that prevents or limits the use of cinnamic acid in food or beverages, the normal usage maximum that has been agreed within the industry is presently 31 ppm.

A number of cinnamic acid derivatives are known and used in the food industry. These include p-dimethylaminocinnamate, cinnamaldehyde, cinnamyl acetate, cinnamyl alcohol, cinnamyl benzoate, cinnamyl cinnamate, cinnamyl formate, cinnamyl isobutyrate, cinnamyl isovalerate and cinnamyl phenylacetate. For the purposes of this invention one could substitute or combine cinnamic acid with one or more of its derivatives although one would need to consider the concentrations required to achieve desired results any impact on aroma and taste.

An acidulant for the purposes of this invention can be any substance that is added in order to lower the pH of a solution and/or impart a sour taste to a beverage. They are usually weak acids such as citric, malic, acetic, succinic, fumaric, lactic, tartaric, ascorbic acids or dilute mineral acids such as hydrochloric, phosphoric or sulphuric acid. In concentrations as high as 3,000 ppm they tend to have a slight if any antimicrobial effect. Maintaining the pH below pH 4.5 ensures that the cinnamic acid remains largely as undissociated acid molecules.

Cinnamic acid is a weak acid with a $pK_a$ of 4.37–4.44. The antimicrobial effectiveness of cinnamic acid depends on it being largely in the form of undissociated acid molecules. Weak acids when dissolved in water do not completely dissociate into ions, but form an equilibrium between the charged, ionized form and the uncharged, undissociated form. The proportions of the two forms will depend on the pH of the solution. In more acidic solutions, there is more of the undissociated form. The pH at which there is an equal concentration of the undissociated and the dissociated forms is called the $pK_a$.

The mode of antimicrobial action of cinnamic acid has been understood since the 50's to be through the inhibition of the utilisation of phenylalanine and tyrosine by microorganisms. It has also been considered as a weak acid preservative.

Weak acid preservatives, in their undissociated form, are thought to be able to dissolve in the membranes of microorganisms, enter the cells, dissociate in the higher pH environment and thus lower the internal pH. This can significantly affect the activity of many crucial enzymes and thus eventually kill the contaminating cells.

However, research by the present inventors shows that cinnamic acid works as a membrane active compound that at low pH increases the concentration of the membrane soluble cinnamic acid, ie. it does not function as a classic weak acid preservative.

Weak acid acidulants have a slight if any effect as weak acid preservatives due to their being unable to penetrate microbial cells. Their concentration is generally referred to in terms of their titratable acidity in citric acid equivalents (in g/l). Tea based beverages routinely contain 1 to 4 g/l titratable acidity. The pH of such beverages tend to fall between pH 2.5 and pH 4.2. Spoilage yeasts can grow down to pH 2.0 while mould spores can typically grow down to pH 1.6.

At a pH such as 3.0 where there is no antimicrobial effect by pH per se, against spoilage yeasts or moulds, adding 100 ppm cinnamic acid will completely extinguish growth. This amount of cinnamic acid at neutral pH is entirely without effect thus demonstrating a substantial synergy between cinnamic acid and low pH.

The preservative and flavouring system of the present invention can optionally include other preservatives. Weak acid preservatives are preferred for this purpose. Alternatively one might envisage using cinnamic acid at low pH, as a supplement for existing weak acid preservatives. From either perspective, traditional weak-acid preservatives function by making cells of microorganisms acidic, i.e. lowering the internal pH, $pH_i$. In solution, the undissociated weak acids are able to dissolve in the membranes of microorganisms and pass inside cells. Charged, dissociated ions cannot enter cells because their charge prevents them dissolving in the lipid membrane. Once inside the cell, the undissociated weak acid molecules arrive in a region of much higher pH (6.5–7.0) and immediately revert to becoming the charged dissociated ionic form. This also releases protons, $H^+$, and so lowers the internal pH.

Continuous release of protons increases the $H^+$ ion concentration and causes the internal pH to drop to levels at which the cellular enzymes cease to function. The movement of weak acid into cells also removes protons from the medium and causes the outside pH to rise.

Eventually the pH inside and outside will be the same and the flow of weak acid into the cell will stop.

To have maximum effect, weak acid preservatives work best in acidic media, where there is much more undissociated acid able to enter cells, and enabling the internal pH of cells to be pushed lower before weak acid transport stops.

Weak acid preservatives include sorbic acid, benzoic acid, sulphite, acetic acid, propionic acid and parabenz. At low concentrations they typically have a slight if any effect as acidulants on beverage pH but can have a major antimicrobial effect. Different weak acids tend to have different $pK_a$ values, e.g. sorbic acid has at $PK_a$ of 4.76, and sulphite has a $pK_a$ of 1.88. This means that at pH 4.76 there will be 50% sorbic acid and 50% sorbate ions. At a higher pH than this, there will be more sorbate and less undissociated acid, e.g. at pH 6.5 there will be 2% sorbic acid and 98% sorbate.

In the preservative and flavouring system of the invention the appropriate choice and concentration of a weak acid preservative will depend on the $pK_a$ of the weak acid and the pH of the final product. The combination of cinnamic acid and benzoic acid is favoured when the pH of the tea based beverage is less than pH 3.0. Whereas the combination of cinnamic acid and sorbic acid is favoured when the pH of the tea based beverage is less than pH 3.4.

The stability of the preservative and flavouring system relies upon being able to maintain the pH of the beverage below the pH 4.5. Generally speaking any art known means for adjusting and maintaining the pH of the tea based beverage can be used. When a weak acid preservative enters a microbial cell, it causes the internal pH to drop and the external pH to rise.

The present inventors believe that there may be a synergy of buffering capacity (titratable acidity) with certain weak acid preservatives such as sorbate, benzoate and sulphite. There may also be some synergism between cinnamic acid and at least certain weak acids as antimicrobials. The aforementioned Japanese patent specification JP A-57-194775 describes such an interaction between cinnamic acid and organic acids such as citric, acetic, malic, fumaric, sorbic, tartaric or lactic acid.

Other factors are thought to affect the preservative abilities of weak acids. For example, in theory at least, two weak acid preservatives with the same $pK_a$ should have equal effects on microbial cells. However sorbic acid is about 200 times more effective as a preservative than acetic acid. The difference may be in the rate at which these weak acid preservatives dissolve in the membrane and enter cells. Sorbic acid is thought to get into cells fast, whereas acetic acid may have difficulty dissolving in the membrane. Therefore if the properties of the microbial membranes are altered, weak acids would be made to enter much faster and this would increase the effectiveness of weak acid preservatives. The stability of a flavouring system of the invention or a tea based beverage that contains that system can be increased by the suitable addition of membrane perturbers such as emulsifiers, surfactants, medium chain fatty acids and their esters (for example nonanoic acid, decanoic acid, monoglyceryl laurate), food grade detergents, sterols (for example cholesterol or ergosterol) and natural oils (for example hop oil, cinnamon oil, lemon essential oil and tea extracts and oils). Some of these may slow down the flow of weak acid preservatives into the cell, while others might increase it.

As mentioned above, the present invention can take the form of an ambient-stable tea based beverage that contains the flavouring system that has been described above. Such a product can be prepared by a method that comprises the steps of adding cinnamic acid or a derivative thereof to a tea solution, adding an acidulant to the mixture to bring and maintain the pH of the beverage below pH 4.5. One could optionally include an additional preservative, for example one or more weak acid preservatives.

An ambient-stable tea based beverage according to the invention should preferably contain no more than 3% tea solids as higher concentrations tend to be undesirably thick and even hazy. A tea solids concentration between 1 and 2% is ideal.

Cinnamic acid is freely soluble in essential oils, benzene, ether, acetone, glacial acetic acid and carbon disulphide. However cinnamic acid is not readily soluble in tea and one would not want to contaminate a tea based beverages with any of the aforementioned chemicals. For that reason it is often necessary to include a solubility enhancing step before adding the cinnamic acid to the tea solution. That may be achieved by spray drying the cinnamic acid onto a carrier powder (which may optionally be sugar based) and adding the powder to the tea, converting the acid to its salt, or dissolving the cinnamic acid in a small quantity of organic solvent such as ethanol, or propylene glycol.

The present inventors have found that it is better to add the cinnamic acid before the acidulant. If the cinnamic acid is added afterwards it tends to precipitate out and there is a consequent loss of activity.

Water quality can seriously undermine the stability of a beverage. This is an important factor when making a tea based beverage for cold filing. For that purpose it will often be important to minimise the yeast content of water used at all stages of production. Art known methods include chlorination/dechlorination and UV irradiation.

Ambient-stable tea based beverages of the invention may be still or carbonated. Carbonation appears to provide a preservative effect in itself and therefore the formulation of a carbonated product need not be the same as a still one. The present inventors have observed that carbonation appears to synergistically increase the antimicrobial action of cinnamic acid and at least some weak acid preservatives such as sorbic acid. The partially dissolved carbon dioxide may impair cell wall growth.

Adding tea to media often increases the risk of microbial spoilage. This is probably because tea provides nutrients for microbial growth. Most microbes that can typically grow in tea based beverages thrive on sugar, a source of nitrogen, oxygen, zinc, magnesium, potassium, phosphate and vitamins. It is therefore advantageous to limit the sugar content to 8 to 10 degrees brix, however one could use up to 60 degrees brix when the product is a tea mix. Oxygen content can be minimised by pre-pasteurisation or some heat treatment or nitrogen sparging. The mineral content of a tea based beverage can be minimised using EDTA, citrate, or a water softener. For example microbes can grow in tea if the concentration of magnesium ions exceeds 0.2 ppm, and they only need trace levels of zinc. One must be careful using citrate for this purpose as it can affect taste.

The invention will now be illustrated with reference to the following examples.

EXAMPLES

Example 1

The Preservative Effect of Trans-cinnamic Acid

An array of flasks containing 50 ml YEPD (Yeast Extract Peptone Dextrose) ranging in cinnamic acid concentration from 0 to 1.0 mM and pH from 2.5 to 7.5 were challenged with *Saccharomyces cerevisiae* X2180 ($10^4$/ml) and yeast counts were spectrophotometrically determined at 600 nm after 42 hours. The results are represented in FIG. 1. They show that the growth of yeasts is seriously inhibited as the pH drops and the concentration of cinnamic acid increases. Growth was prevented at pH 2.5 with 0.4 to 1.0 mM cinnamic acid and at pH 3.5 with 0.6 to 1.0 mM cinnamic acid. Independently adjusting the pH or the cinnamic acid concentration does not prove as successful thus showing that the interaction is synergistic rather than purely additive.

Example 2

The Preservative Effect of Cinnamic Acid, Methyl Ester

Figure 2:
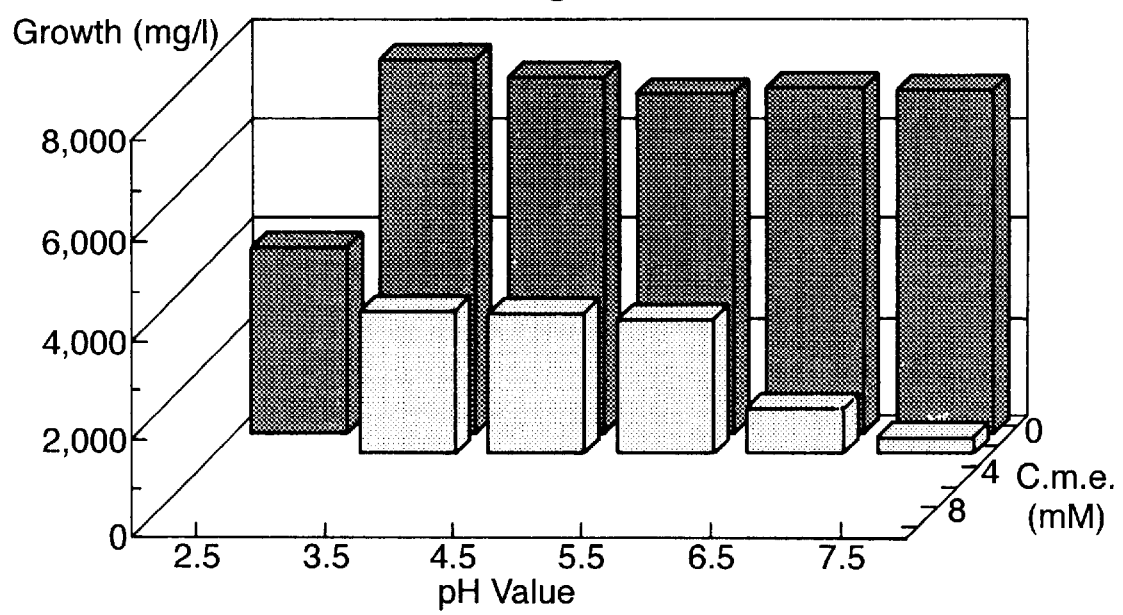
FIG. 2 represents a bar graph of values reported in Example 2.

An array of flasks containing 10 ml YEPD (Yeast Extract Peptone Dextrose) ranging in cinnamic acid (methyl ester) concentration from 0 to 10 mM and pH from 2.5 to 7.5 were challenged with *Saccharomyces cerevisiae* X2180 ($10^4$/ml) and yeast counts were spectrophotometrically determined at 600 nm after 140 hours. The results are represented in FIG. 2. They show that the growth of yeasts was prevented with 4 mM cinnamic acid (methyl ester) within the pH range. The methyl ester of cinnamic acid is therefore much less effective than trans-cinnamic acid and the antimicrobial effect of pH is less significant.

Example 3

The Preservative Effect of Cinnamic Acid, Ethyl Ester

Figure 3:
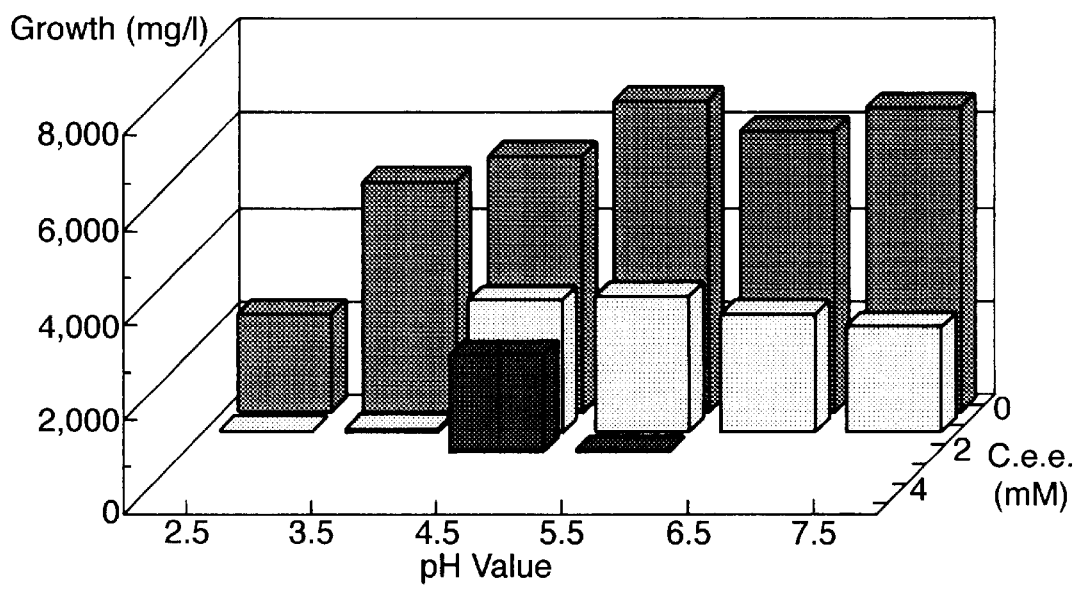
FIG. 3 represents a bar graph of values reported in Example 3.

An array of flasks containing 10 ml YEPD (Yeast Extract Peptone Dextrose) ranging in cinnamic acid (ethyl ester) concentration from 0 to 10 mM and pH from 2.5 to 7.5 were challenged with *Saccharomyces cerevisiae* X2180 ($10^4$/ml) and yeast counts were spectrophotometrically determined at 600 nm after 72 hours. The results are represented in FIG. 3. They show that the growth of yeasts was prevented with 6 mM cinnamic acid (methyl ester) within the pH range and at 4 mM below pH 4.52. The ethyl ester of cinnamic acid is therefore less effective than trans-cinnamic acid and the antimicrobial effect of pH is less significant.

Example 4

The Preservative Effect of 2-phenylpropionic Acid

Figure 4:
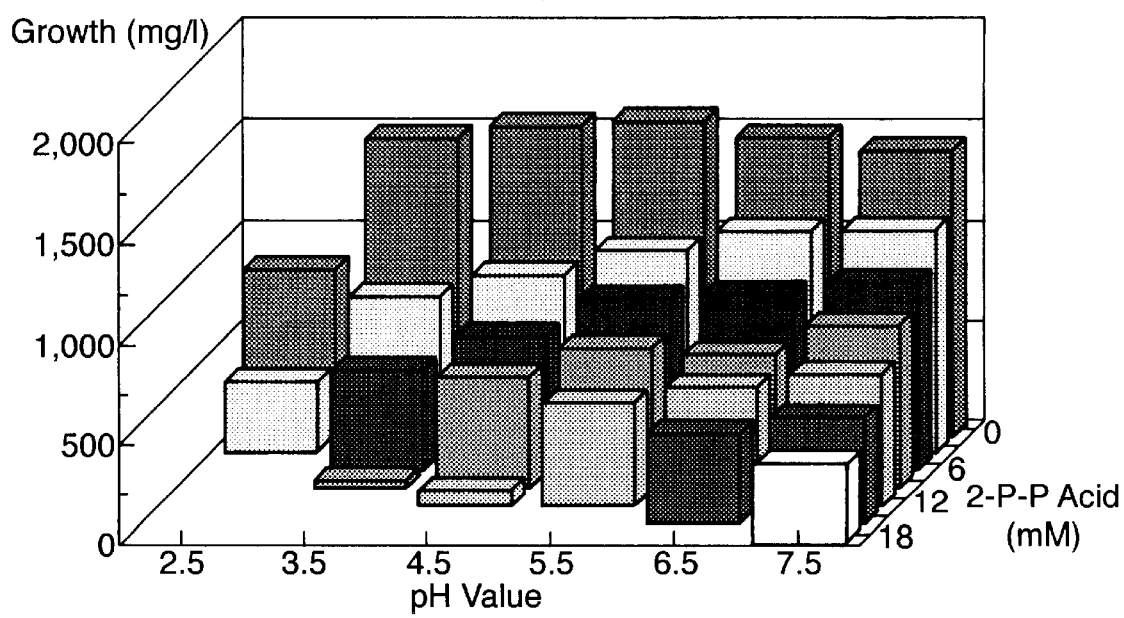
FIG. 4 represents a bar graph of values reported in Example 4.

An array of flasks containing 10 ml capped YEPD (Yeast Extract Peptone Dextrose) ranging in 2-phenylpropionic acid concentration (cinnamic acid is 3-phenyl-2-propenoic acid) from 0 to 18 mM and pH from 2.5 to 7.5 were challenged with *Saccharomyces cerevisiae* X2180 ($10^4$/ml) and yeast counts were spectrophotometrically determined at 600 nm after 3 days. The results are represented in FIG. 4. They show that the growth of yeasts is seriously inhibited as the pH drops and the concentration of 2-phenylpropionic acid increases. However it would seem that 2-phenylpropionic acid is less effective than trans-cinnamic acid.

Example 5

The Preservative Effect of Cinnaldehyde

Figure 5:
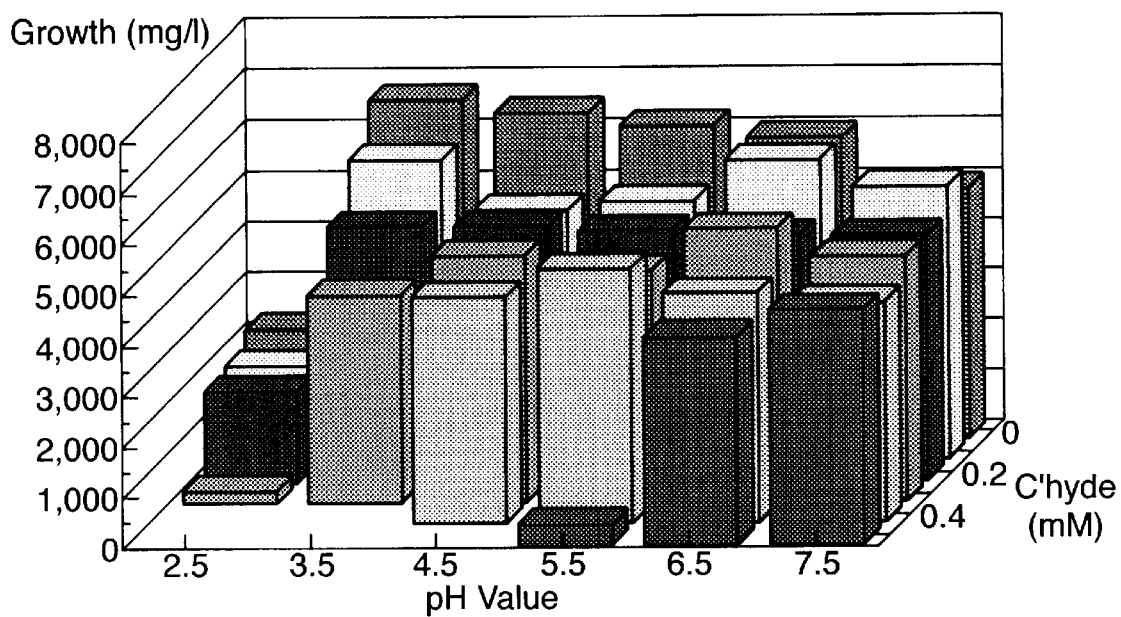
FIG. 5 represents a bar graph of values reported in Example 5.

An array of flasks containing 10 ml YEPD (Yeast Extract Peptone Dextrose) ranging in cinnaldehyde concentration from 0 to 0.5 mM and pH from 2.5 to 7.5 were challenged with *Saccharomyces cerevisiae* X2180 ($10^4$/ml) and yeast counts were spectrophotometrically determined at 600 nm after 81 hours. The results are represented in FIG. 5. They show that the growth of yeasts was prevented with 0.4 mM cinnaldehyde at pH 2.5 and pH 3.5 and 0.5 mM cinnaldehyde at pH 4.5. There is an antimicrobial effect of pH but this becomes more evident as the concentration of cinnaldehyde exceeds 0.4 mM. As a preservative cinnaldehyde is an attractive one however its taste and aroma is are much stronger than trans-cinnamic acid.

Example 6

The Preservative Effect of 2-methoxycinnamaldehyde

Figure 6:
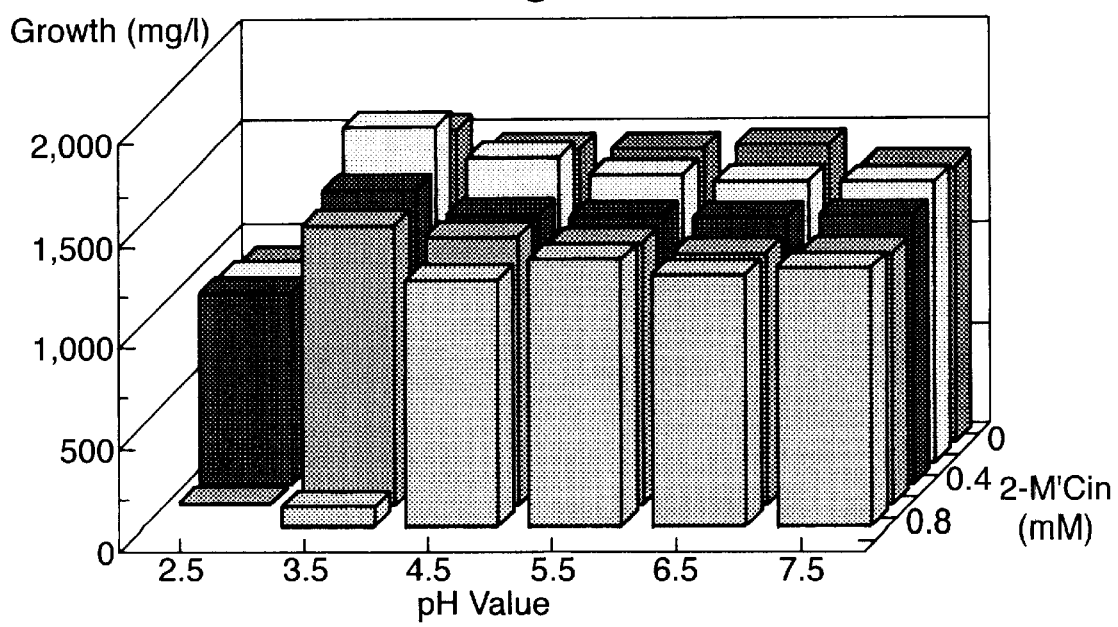
FIG. 6 represents a bar graph of values reported in Example 6.

An array of flasks containing 10 ml capped YEPD (Yeast Extract Peptone Dextrose) ranging in 2-methoxycinnamaldehyde concentration from 0 to 1.0 mM and pH from 2.5 to 7.5 were challenged with *Saccharomyces cerevisiae* X2180 ($10^4$/ml) and yeast counts were spectrophotometrically determined at 600 nm after 3 days. The results are represented in FIG. 6. They show that the growth of yeasts was prevented with 0.8 mM 2-methoxycinnamaldehyde at pH 2.5 and 1.0 mM 2-methoxy-cinnamaldehyde from pH 2.5 to pH 7.5. Any indication of an antimicrobial effect of pH only seems to become when the concentration of 2-methoxy-cinnamaldehyde exceeds 0.6 mM.

Example 7

The Preservative Effect of Cinnamyl Alcohol

Figure 7:
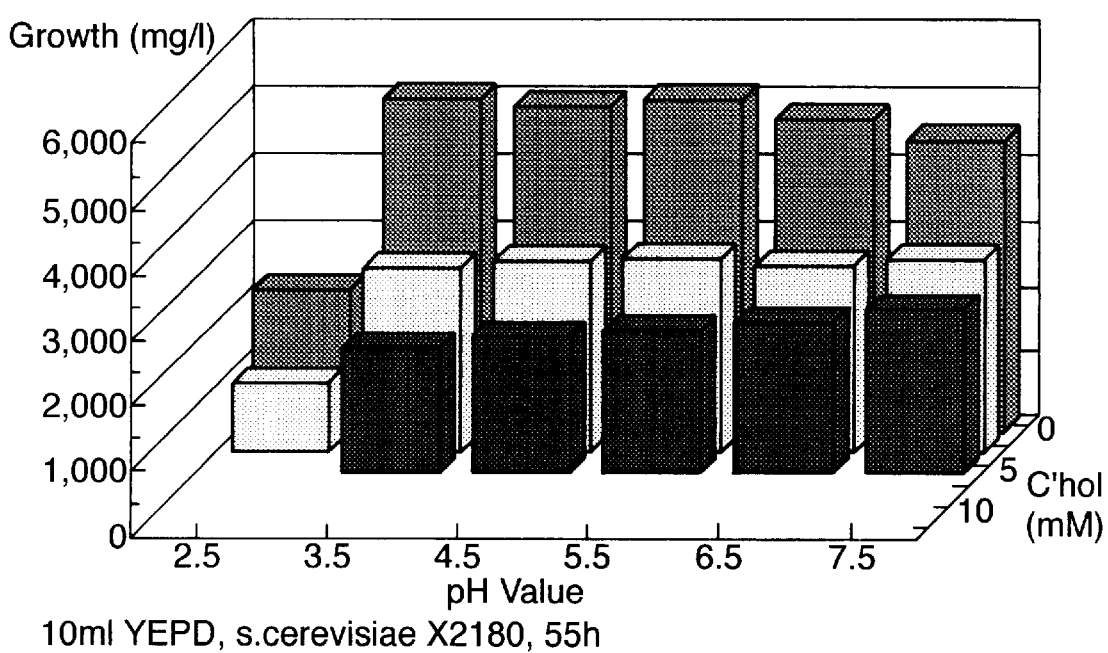
FIG. 7 represents a bar graph of values reported in Example 7.

An array of flasks containing 10 ml YEPD (Yeast Extract Peptone Dextrose) ranging in cinnamyl alcohol concentration from 0 to 10 mM and pH from 2.5 to 7.5 were challenged with *Saccharomyces cerevisiae* X2180 ($10^4$/ml) and yeast counts were spectrophotometrically determined at 600 nm after 55 hours. The results are represented in FIG. 7. They show that the growth of yeasts was prevented with 0.4 mM cinnamyl alcohol at pH 2.5 and 0.6 mM cinnamyl alcohol from pH 2.5 to pH 7.5. It would seem the antimicrobial effect of pH is minimal.

Example 8

Low pH Minima for Spoilage Yeasts

Figure 8:
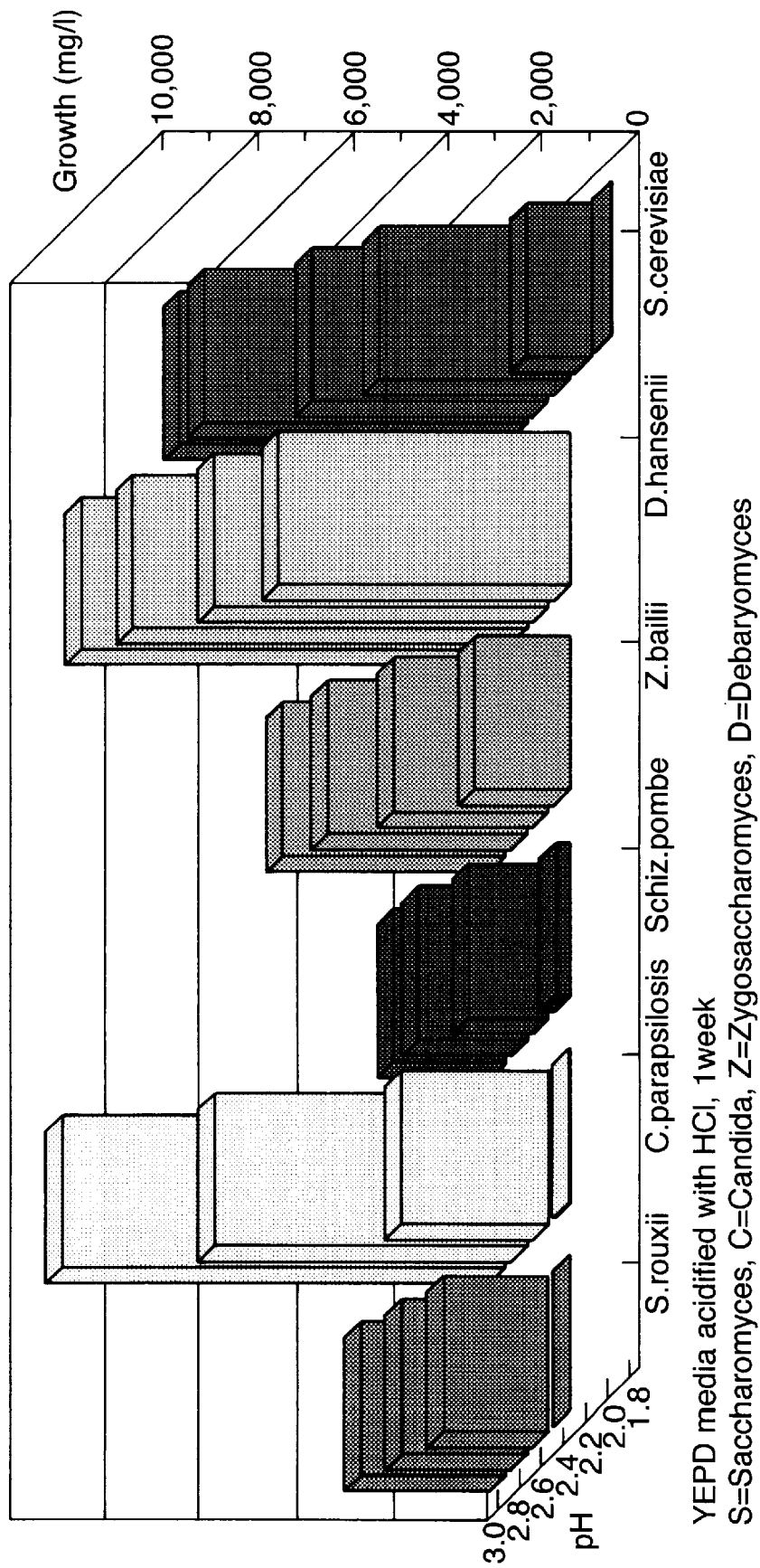
FIG. 8 represents a bar graph of values reported in Example 8.

A selection of spoilage yeasts (*Saccharomyces rouxii, Candida parapsilosis, Schiz. pombe, Zygosaccharomyces bailii, Debaryomyces hansenii* and *Saccharomyces cerevisiae*) were left to grow in YEPD (Yeast Extract Peptone Dextrose) at various pH (acidified with hydrochloric acid) for 7 days. Growth was measured spectrophotometrically. The results are represented in FIG. 8 and show the impact of pH alone on the growth of spoilage yeasts, ie in the absence of cinnamic acid or any its derivatives.

Example 9

Low pH Minima for Spoilage Moulds

Figure 9:
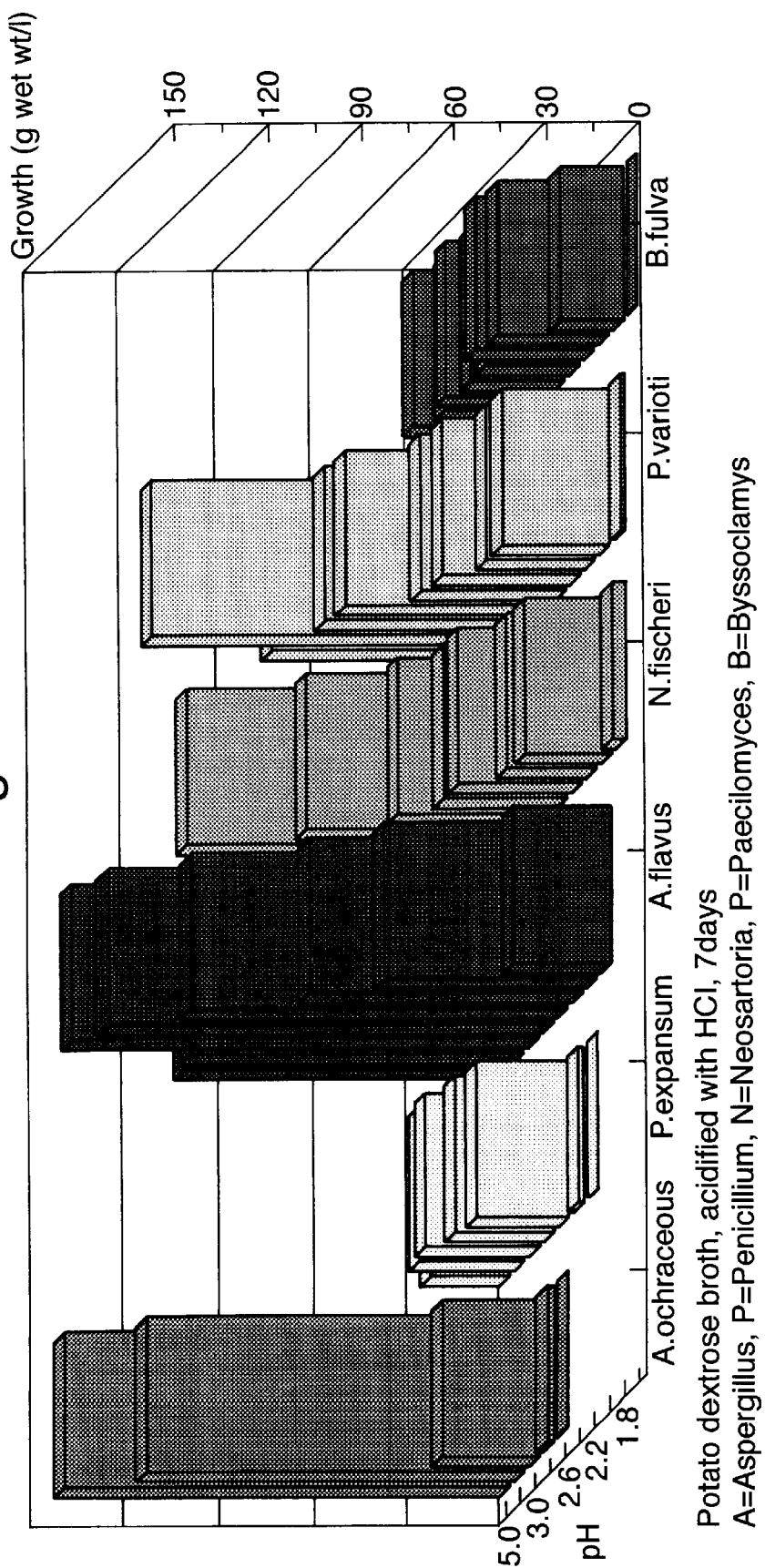
FIG. 9 represents a bar graph of values reported in Example 9.

A selection of spoilage moulds (*Aspergillus ochraceous, Penicilium expansum, Aspergillus flavus, Neosartoria fischeri, Paecilomyces varioti* and *Byssoclamys fulva*) were left to grow in potato dextrose broth at various pH (acidified with hydrochloric acid) for 7 days. Growth was measured by filtration and weighing. The results are represented in FIG. 9 and show the impact of pH alone on the growth of spoilage moulds, ie in the absence of cinnamic acid or any its derivatives.

Example 10

Formulations

A still lemon flavoured iced tea contains 77.00 g/l granulated sugar, 1.20 g/l tea, 150 ppm trans-cinnamic acid, 1.275 g/l citric acid and 0.200 g/l ascorbic acid as acidulants and 2.20 g/l lemon flavouring. A variation that includes 0.40 g/l of the weak acid preservative potassium sorbate need only contain 30 ppm trans-cinnamic acid to achieve the same stability. In both cases in order to maintain the preservative system the pH must not exceed 3.3.

Example 11

Preservation of Carbonated Tea Based Beverages at pH 3.4

The stability of a carbonated ready to drink tea beverage containing 1.2 g/l tea solids was tested at pH 3.4 in the presence and the absence of 30 ppm cinnamic acid and 150 ppm benzoic acid. Stability was determined by inoculating beverage samples with a yeast cocktail containing three strains of *Z. bailii* and spectrophotometrically measuring for any yeast growth after 3 weeks. The results are given in Table 1 below.

TABLE 1

Effect of cinnamic and benzoic acids on the stability of a carbonated tea based beverage

| Volumes of $CO_2$ | 150 ppm Benzoic | 30 ppm Cinnamic 150 ppm Benzoic |
|---|---|---|
| 0 | Unstable | Unstable |
| 2.2 | Unstable | STABLE |
| 2.8 | STABLE | STABLE |

These results show that carbonation enhances the preservative performance of benzoic acid and in particular the combination of benzoic and cinnamic acids at pH 3.4.

Example 12

Preservation of Carbonated Tea Based Beverages at pH 3.6

The stability of a carbonated ready to drink tea beverage containing 1.2 g/l tea solids was tested at pH 3.6 in the presence and the absence of cinnamic and sorbic acids. Stability was determined by inoculating beverage samples with a yeast cocktail containing three strains of *Z. bailii* and spectrophotometrically measuring for any yeast growth after 16 weeks. The results are given in Table 2 below.

TABLE 2

Effect of cinnamic and sorbic acids on the stability of a carbonated tea based beverage

| Volumes of $CO_2$ | 0 Cinnamic 0 Sorbic | 30 Cinnamic 100 Sorbic | 30 Cinnamic 200 Sorbic |
|---|---|---|---|
| 0 | Unstable | Unstable | Unstable |
| 2.2 | Unstable | Unstable | Unstable |
| 2.4 | Unstable | Unstable | Unstable |
| 2.8 | Unstable | Unstable | STABLE |

These results show that carbonation can bring stability to a tea based beverage containing 30 ppm cinnamic and 200 ppm sorbic acid at pH 3.6.

We claim:

1. An ambient stable tea based beverage that comprises a tea extract that contains no more than 3% tea solids, cinnamic acid or an acidic derivative thereof in a concentration of between 1 and 150 ppm and an acidulant in an amount that maintains the pH of the beverage below pH 4.5.

2. A beverage according to claim 1 that contains between 10 and 50 ppm cinnamic acid.

3. A beverage according to claim 1 that contains between 10 and 31 ppm cinnamic acid.

4. A beverage according to claim 1 wherein the acidulant is selected from the group consisting of citric, malic, acetic, succinic, fumaric, lactic, tartaric, ascorbic, hydrochloric, phosphoric and sulphuric acids.

5. A beverage according to claim 1 that includes an additional preservative.

6. A beverage according to claim 1 that includes a substance that is capable of perturbing microbial membranes.

7. A beverage according to claim 5 wherein the preservative is a weak acid selected from the group consisting of sorbic acid, benzoic acid, sulphite, acetic acid, propionic acid and parabenz.

8. A beverage according to claim 1 that contains between 1 and 2% tea solids.

9. A beverage according to claim 1 that is sufficiently carbonated to synergistically increase the antimicrobial activity of the preservative and flavouring system.

10. A method for preparing an ambient-stable beverage suitable for cold filing comprising the steps of adding an antimicrobially active amount of cinnamic acid or a acidic derivative thereof to a tea solution that contains no more than 3% tea solids and adding an acidulant in an amount that maintains the pH of the beverage below pH 4.5.

11. A method according to claim 10 wherein the cinnamic acid or acidic derivative thereof is spray dried onto a carrier powder to enhance its solubility in the beverage.

* * * * *